United States Patent Office 3,429,970
Patented Feb. 25, 1969

3,429,970
METHOD OF HINDERING THE METAMORPHOSIS AND REPRODUCTION OF ARTHROPODES
Rudolf Rüegg, Bottmingen, Switzerland, and Peter Schmialek, Berlin-Dahlem, Germany, assignors to Hoffmann-La Roche Inc., Nutley, N.J., a corporation of New Jersey
No Drawing. Continuation-in-part of applications Ser. No. 168,834, Jan. 25, 1962, Ser. No. 196,521, May 21, 1962. This application Aug. 14, 1963, Ser. No. 301,968
Claims priority, application Germany, Feb. 2, 1961, Sch 29,159; Switzerland, May 24, 1961, 6,019/61
U.S. Cl. 424—333                          6 Claims
Int. Cl. A01n 9/12, 9/20, 9/24

This application is a continuation-in-part of United States patent application Ser. No. 168,834, filed Jan. 25, 1962, and of United States patent application Ser. No. 196,521, filed May 21, 1962, both of which are now abandoned.

This invention relates, in general, to novel pesticides. More particularly, the invention relates to compositions having outstanding pesticide activity and to the active pesticide components of such compositions.

Many of the pesticide compositions which are presently commercially available for use as contact poisons for insects and other pests are disadvantageous since a particular species of pests may develop a resistance thereto when the same composition is frequently or continually employed. In order to ensure their effectiveness, such compositions must be used in gradually increasing concentrations. The necessity of using a high concentration of a poison, obviously, poses a threat, for example, to humans as well as to domestic animals. On the other hand, certain insecticidal compositions are known to which apparently no resistance is developed. For the most part, however, such compositions have proved to be extremely toxic to warm-blooded animals with the result that their use must necessarily be quite limited.

It has now been found that there is a class of isoprenoid compounds which, while practically harmless to warm-blooded animals, exerts a disturbing influence upon the normal development of arthropodes; for example, upon the normal development of insects, crawfishes, and crabs. Such compounds impede the metamorphosis of the normal pupation of pests and result in the formation of members of the treated species which are inviable or sterile. This ultimately leads, indirectly at least, to the destruction of the species.

Moreover, the ability of a compound, or a class of compounds, to impede metamorphosis can be utilized to achieve another practical advantage. Such property is useful in the culture of especially large larvae, and, hence, it could be utilized to good advantage in the growing of silk worms.

Thus in its most comprehensive embodiment, the present invention is concerned with novel pesticidal compositions.

In a more restricted embodiment, the invention is concerned with the active pesticidal component of such compositions and with processes for producing such compounds.

In a further embodiment, the invention is concerned with processes for hindering or impeding the metamorphosis and reproduction of arthropodes.

The pesticidal compositions of the present invention contain, as the active ingredient thereof, an isoprenoid compound having the general formula:

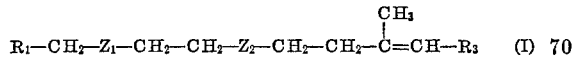

or a salt thereof.

In Formula I, the symbol $Z_1$ represents a divalent radical selected from the group consisting of

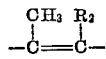

and

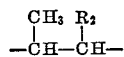

the symbol $Z_2$ represents a divalent radical selected from the group consisting of

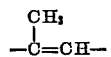

and

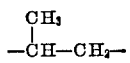

the symbol $R_1$ represents a hydrogen atom or a lower alkyl group; the symbol $R_2$ represents a hydrogen atom or a lower alkyl group; and the symbol $R_3$ represents a $-CH_2OH$, $-CH_2SH$, $-CHO$, $-CH_2CH_2COCH_3$ $-CH_2-NH_2$ or a $-COOH$ group. Additionally, the symbol $R_3$ represents an etherified hydroxy group, that is, $-CH_2OR_4$, and an etherified mercapto group, that is, $-CH_2SR_4$, in which $R_4$ is a lower alkyl or lower alkenyl radical. Moreover, the symbol $R_3$ represents a

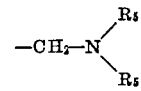

group in which either or both of the symbols $R_5$ represent lower alkyl or lower alkenyl radicals. Where only one of the symbols $R_5$ represents a lower alkyl or lower alkenyl radical the other $R_5$ substituent is hydrogen.

As indicated heretofore, the compounds of Formula I are useful in impeding the metamorphosis and/or the reproduction of arthropodes. The activity of the compounds is such that arthropodes, at any stage of their development, can be effectively treated therewith.

From a practical standpoint, the utility of many of the compounds depicted in Formula I is greatly enhanced by the fact that their solubility characteristics can be varied at will. For example, by esterification of farnesol with phosphoric acid, one can obtain a readily water-soluble product. On the other hand, by means of the esterification of farnesol with acetic acid, one can obtain a fat-soluble compound.

The following-named compounds, all of which are encompassed within the scope of Formula I, have been found to be especially suitable for use as the active ingredients of the present pesticide compositions: farnesol; farnesal; farnesene acid; farnesyl methyl ether; farnesyl-N-butyl ether; farnesyl allyl ether; 3,7,11-trimethyl-tridec-atrien-1-ol, 1-methoxy-3,7,11-trimethyl-tridecatrien-(2,6,-10); 10,11-dihydrofarnesol; farnesyl acetate; farnesyl mercaptan; farnesyl triethylammonium bromide; farnesyl methyl sulfide; farnesyl methylamine; farnesyl diisopropylamine; farnesyl diethylamine; and N-(diethylamino-ethyl)-farnesylamine.

Certain of the compounds which are included within the scope of Formula I are disclosed in the literature. Some of the known compounds have been found to occur in nature. Enriched extracts of materials containing such compounds can be used in carrying out the present invention. Furthermore, in the case of some of the compounds, processes for synthesizing same are well known. Such compounds, synthetically produced, can be used in the practice of this invention. On the other hand, certain of the active ingredients of the presently claimed pesticidal compositions are novel. The novel compounds, all of which are suitable for use as the active ingredient of the present pesticide compositions, have the formula:

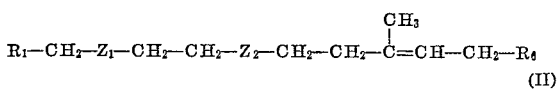

(II)

in which formula the symbols $Z_1$, $Z_2$ and $R_1$ have the same meaning as in Formula I; and in which the symbol $R_6$ represents a mercapto group; an etherified hydroxy group; an etherified mercapto group and an amino group.

Furthermore, acid addition salts and quaternary compounds produced from these compounds, all of which are novel, can be used in formulating the pesticide compositions of this invention.

The amino group which, in Formula II, is represented by the symbol $R_6$ can be a primary, secondary, or tertiary amino group. Thus, for example, the symbol $R_6$ represents a $-NH_2$, $NH-Y$ or

group in which the symbol Y represents a lower alkyl or a lower alkenyl radical. The etherified hydroxy groups and the etherified mercapto groups which are, in Formula II, represented by the symbol $R_6$, are residues of hydroxy groups and mercapto groups which have been etherified with a lower alkyl and a lower alkenyl group. Such groups can be depicted by the formula $-O-Y$ and $-S-Y$, in which the symbol Y represents a lower alkyl or a lower alkenyl radical.

The novel compounds of Formula II are readily prepared. In their synthesis, a halogenide having the formula:

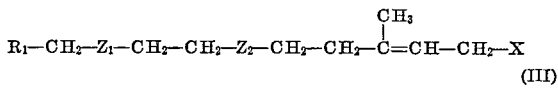

(III)

in which the symbols $Z_1$, $Z_2$ and $R_1$ have the same meaning as in Formulas I and II; and in which the symbol X represents a halogen atom, preferably chlorine or bromine, is reacted, in a known manner, with a compound having the formula:

$$A-R_6 \quad (IV)$$

in which the symbol $R_6$ has the same meaning as in Formula II; and in which the symbol A represents a hydrogen atom, an alkali metal or an alkaline earth metal.

Where, however, the symbol $R_6$ represents an amino group, the symbol A will represent also a lower alkyl group. The basic compound which is obtained by the reaction of a compound of Formula III with a compound of Formula IV can be converted into a salt, if desired.

As the haolgenide, one can use a suitable bromide, as, for example, farnesyl bromide, 1-bromo-3,7,11-trimethyl-tridecatrien-(2,6,10). As the second reaction component, one can employ, for example, hydrogen sulfide, a lower aliphatic alcohol, such as methanol, ethanol, dimethylaminoethanol, etc.; phenol; benzyl alcohol; a lower thio alcohol, such as methyl mercaptan, ethyl mercaptan, etc. Where the symbol A in Formula IV represents a hydrogen atom and where the symbol $R_6$ in that formula represents a mercapto group or an etherified hydroxy or an etherified mercapto group, the reaction must be carried out in the presence of an acid-binding agent. As the acid-binding agent, one can use, for example, sodium carbonate, potassium carbonate, sodium bicarbonate, etc. The necessity of using an acid-binding agent can, however, be obviated by the expedient of reacting the halogenide with a compound of Formula IV, in which the symbol A represents an alkali metal or an alkaline earth metal. For example, an acid-binding agent need not be used where a halogenide of Formula III is reacted with an alkali metal alcoholate, such as sodium methylate, sodium ethylate, etc. Other examples of compounds which fall within the scope of Formula IV, and which, accordingly, are suitable for use in the practice of this invention are ammonia and primary and secondary amines, such as methylamine, dimethylamine, diethylamine, diethylaminoethylamine, etc.

The novel compounds of Formula II can be converted into acid addition salts or into quaternary compounds by treating such compounds either with a suitable acid, either inorganic or organic in nature, such as hydrochloric acid, hydrobromic acid, sulphuric acid, phosphoric acid, oxalic acid, citric acid, etc., or by treating the basic compound with an alkali halogenide, such as methyl bromide, ethyl bromide, etc. The quaternary compound can be obtained directly by reacting the halogenide with a tertiary amine.

The compounds of Formula I, including the novel compounds of Formula II, as well as functional derivatives of the Formula I compounds, such as ethers, esters, acid anhydrides, amides, acetals, semiacetals, etc., or N-alkylated derivatives thereof, such as dialkylamino- or dialkylamido-derivatives, exert an arresting influence on the pupation processes of insects. They can, therefore, be used as insecticides and in the culture of especially large, useful larvae, such as silk moths. The compounds of Formula I and their derivatives, including the novel compounds of Formula II, are fully effective as insecticides against, for example, the assassin bug (*Rhodnius prolixus*); the milkweed bug (*Oncopeltus fasciatus*); the bedbug (*Cimex lectularius*) and meal moth (*Ephestia kühniella*).

The compounds of Formula I, including, of course, the novel compounds of Formula II, are generally embodied into a form suitable for convenient application. For example, the compounds can be embodied into pesticidal compositions which are provided in the form of emulsions, suspensions, solutions, dusts and aerosol sprays. In general, such compositions will contain, in addition to the active compound, the adjuvants which are found normally in pesticide preparations. In these compositions, the active compounds of this invention can be employed as the sole pesticide component or they can be used in admixture with other compounds having similar utility. The pesticide compositions of this invention can contain, as adjuvants, organic solvents, such as sesame oil, heavy petroleum, etc.; water; emulsifying agents; surface active agents; talc; pyrophyllite; diatomite; gypsum; clays; propellants, such as dichorodifluoromethane, etc. If desired, however, the active compounds can be applied directly to feedstuffs, seeds, etc. upon which the pests feed. When applied in such a manner, it will be advantageous to use a compound which is not volatile. In connection with the activity of the presently disclosed pesticidal compounds, it should be fully understood that it is not necessary that they be active as such. The purposes of this invention will be fully served if the compound is rendered active by external influences, such as humidity, or by some physiological action which occurs when the compound is ingested into the body of the pest.

The precise manner in which the pesticidal compositions of this invention are used in any particular instance will be readily apparent to a person skilled in the art. Generally, the active pesticide compound will be embodied in the form of a liquid composition, for example, an emulsion, suspension or aerosol spray. While the concentration of the active pesticide in the present compositions can vary within rather wide limits, ordinarily the pesticide compound will comprise not more than about 10.0% by weight of the composition. Preferably, however, the pesticide compositions of this invention will be in the form of solutions containing about 1.0% by weight of the active pesticide compound.

For completeness of disclosure, there is included hereinafter, a description of a process for preparing those compounds of Formula I, wherein the symbol $R_3$ represents a $-CH_2OH$ radical and wherein at least one of the symbols $R_1$ and $R_2$ represent a lower alkyl group. In general, such compounds are prepared starting from the correspondingly substituted geranyl acetone by addition of acetylene, partial hydrogenation, halogenation with allyl rearrangement, conversion into a lower aliphatic carboxylic acid ester and hydrolysis.

For a fuller understanding of the nature and objects of this invention, reference may be had to the following examples which are given merely as further illustrations of the invention and are not to be construed in a limiting sense.

EXAMPLE 1

6 g. of sodium were dissolved in 120 ml. of anhydrous methanol and this solution was cooled to 0° C. 64.0 g. of farnesyl bromide were added to this solution, drop by drop, over a period of about 30 minutes and the system was stirred overnight at a temperature of about 25° C. Sodium bromide was eliminated by filtration, the filtrate was diluted with 200 ml. of water, the separated oil was taken up in petroleum ether, and the petroleum ether solution was washed with water until neutral. The solution was dried over sodium sulfate and filtered through a chromatographic column containing 500 g. of aluminum oxide (activity II). The solvent was evaporated in vacuum and the residue was distilled under high vacuum. This yielded farnesyl methyl ether as a colorless slightly viscous oil; boiling point 72°/0.05 mm.; $n_D^{24}=1.4750$.

The farnesyl bromide employed as the starting material can be obtained as follows: To a solution, initially chilled to a temperature of $-10°$ C., of 50 g. trans-nerolidol and 1.0 g. of pyridine in 150 ml. of petroleum ether, there was added, drop by drop, over a period of about 20 minutes a mixture of 10 ml. phosphorus tribromide and 50 ml. of petroleum ether in such a way that the temperature did not rise above $-5°$ C. The solution was then stirred for one hour at about $-5°$ C. The solution was poured onto ice water. The water layer was separated out and the petroleum ether solution was washed with water until neutral. This solution was dried over sodium sulfate and the solvent was evaporated in vacuum at a maximum temperature of about 30° C., yielding farnesyl bromide; $n_D^{24}=1.5040$.

EXAMPLE 2

64 g. of farnesyl bromide were added, drop by drop, to a suspension of 100 g. of potassium carbonate in 300 ml. of anhydrous methanol. The mixture was stirred at reflux for about 20 hours, then cooled, filtered free of salt, and the solvent was removed under vacuum. The residue was dissolved in 200 ml. of petroleum ether and filtered through 500 g. of aluminum oxide (activity II). After the removal of the solvent, the residue was distilled under high vacuum to yield farnesyl methyl ether.

EXAMPLE 3

The following compounds were prepared by the methods described in Examples 1 and 2:

Farnesyl-n-butyl ether, B.P. 85–87° C./0.01 mm.;

$n_D^{24}=1.4699$

1 - methoxy-3,7,11-trimethyl-tridecatriene-(2,6,10), B.P. 65° C./0.01 mm.; $n_D^{22}=1.4750$.

This product was obtained in the form of a slightly viscous oil, colorless in appearance.

EXAMPLE 4

64 g. of farnesyl bromide were mixed with 50 ml. of diethylamine and the mixture was heated at reflux for about three hours. The excess diethylamine was removed by distillation. The residue was taken up in petroleum ether and the reaction product was isolated by extraction with 1 N hydrochloric acid. The acid solution was made alkaline with sodium hydroxide solution. The free base was taken up in petroleum ether, washed with 50 ml. of water and dried over sodium sulfate. The solvent was distilled off and the residue was distilled under high vacuum. Farnesyl diethylamine was obtained in the form of a colorless slightly viscous oil having a boiling point of 97–98° C./0.01 mm.; $n_D^{22}=1.4771$.

The following compounds were prepared by the method described above:

Tetrahydrofarnesyl diethylamine, B.P. 96°/0.1 mm.; $n_D^{20}=1.4562$;

3,7,10,11 - tetramethyl - dodecatriene - (2,6,10)-yl diethylamine, B.P. 104–106° C./0.1 mm.; $n_D^{20}=1.4820$.

EXAMPLE 5

64 g. of farnesyl bromide were added, drop by drop, to a solution of 10.0 g. of sodium hydroxide in 150 ml. of anhydrous alcohol, the alcoholic sodium hydroxide solution having first been saturated with hydrogen sulfide. The solution was stirred at a temperature of about 25° C. for a period of above five hours while introducing hydrogen sulfide. Thereafter, the solution was mixed with 300 ml. of water. The oil-like product which separated out was taken up in petroleum ether and the petroleum ether solution was washed with water until neutral. After drying over sodium sulfate, the solvent was distilled off and the residue fractionated at a high vacuum. Farnesyl mercaptan was obtained in the form of a colorless slightly flowing oil having a boiling point of 76° C./0.01 mm.; $n_D^{24}=1.5030$.

EXAMPLE 6

64.0 g. of farnesyl bromide were mixed with 25.0 ml. of benzene and 25.0 ml. of triethylamine. The mixture was heated for about two hours at a temperature of about 30° C. Thereafter, the solution was cooled and the salt which precipitated therefrom was removed by filtration. The solution was then evaporated to dryness in vacuo. The solid residue was agitated with 200 ml. of petroleum ether at a temperature of 40–45° C. for a period of two hours. This resulted in the crumbling of the solid cake. The solution was thereafter filtered rapidly through a Buchner funnel, washed with petroleum ether and dried in a dessicator over calcium chloride. Farnesyl triethylammonium bromide was obtained in the form of a light gray, very hygroscopic powder.

EXAMPLE 7

7 g. of sodium were dissolved in 400 ml. of ammonia. The solution was decolorized and to it were added, dropwise, 64 g. of farnesyl bromide in 150 ml. of absolute ether. The solution was stirred for 5 hours and to it were added 25 g. of ammonium chloride, whereupon the ammonia was evaporated off. The remaining slurry was diluted with petroleum ether, washed with water until neutral, dried and concentrated to dryness. The crude farnesyl amine was adsorbed on 500 g. of aluminium oxide (activity II) and the byproducts formed were eluted with petroleum ether, whereupon the pure product was eluted with ether and distilled in high vacuo after evaporating off the solvent. Thus, there was obtained farnesyl amine of B.P. 110° C./0.02 mm.; $n_D^{20}=1.4887$.

EXAMPLE 8

6 g. of sodium were dissolved in 150 ml. of methanol and to the solution obtained, which was cooled to 0°, were added dropwise 13 g. of methylmercaptan. After 30 minutes standing, 64 g. of farnesyl bromide were added dropwise to the solution obtained and the whole mixture refluxed for 2 hours. The solvent was then distilled off, the residue taken up in petroleum ether, washed with water until neutral, dried and concentrated. The residue was then distilled in high vacuo to obtain methylmercapto farnesyl of B.P. 85° C./0.02 mm.; $n_D^{20}=1.5044$.

EXAMPLE 9

53 g. of farnesyl bromide in 40 ml. of ether were added dropwise to a solution of 60 g. of diethylaminoethylamine. The mixture was refluxed for 4 hours and poured into dilute sodium hydroxide and water. The solution was extracted with ether and the ether solution washed three times with water, dried over sodium sulfate and freed of the solvent by evaporation. The residue was distilled in high vacuo to give N-(diethylaminoethyl)-farnesyl amine of B.P. 119–122°/0.05 mm.

EXAMPLE 10

53 g. of farnesyl bromide in 40 ml. of benzene were added dropwise at 0–10° C. to a solution of 4.3 g. of sodium, 22 g. of dimethylaminoethanol and 60 ml. of benzene. Thereupon, the mixture was stirred for 5 hours at 20° C. and treated as in Example 9. The crude product was distilled in high vacuo to give farnesyl dimethylaminoethylate of B.P. 105° C./0.01 mm.

EXAMPLE 11

50 pupae of *Tenebrio molitor* were besprinkled once with 2 ml. of a 10% alcoholic farnesol solution. During the time of pupation only three animals developed to imagines, which however showed drawbacks due to a perturbated development. Out of 50 control animals, only three did not develop to mature insects.

EXAMPLE 12

150 larvae of *Calliphora erythrocephala* were fed with 150 g. of ground flesh, which was soaked with 15 ml. of a 0.1% aqueous emulsion of farnesal. The pupation of almost all experiment animals proved to be strongly behind that of the control animals. Most of the slipping imagines, insofar as they could escape from the cocoon, were cripples and therefore unable to copulate.

EXAMPLE 13

20 larvae of *Galleria mellonella* in the last stage of development were besprinkled once with 2 ml. of a 2% alcoholic solution of farnesyl acetate. The major part of these animals did not form cocoons contrary to the untreated control animals. The loose web of the larvae stage was a clear proof of their disturbed development.

EXAMPLE 14

150 larvae of *Tenebrio molitor* were fed with 150 g. of wheat bran that were soaked with 5 ml. of a 1% aqueous solution of farnesyl phosphate. The development of these animals was by some months behind that of the control animals.

Results analogous to those described in the above examples were obtained when the following active substances were used as pesticides: farnesyl methyl ether, farnesyl ethyl ether, farnesyl n-butyl ether, farnesyl allyl ether, diethyl farnesyl amine, farnesyl thioether, farnesyl mercaptan, farnesyl methylamine, 10,11-dihydrofarnesol, 10,11-dihydrofarnesyl methyl ether.

We claim:

1. A process for hindering the metamorphosis of arthropodes which comprises treating said arthropodes at any stage of their development with an effective pesticidal amount of a composition comprising (a) a compound having the formula $$R_1-CH_2-Z_1-CH_2-CH_2-Z_2-CH_2-CH_2-\overset{\overset{\displaystyle CH_3}{|}}{C}=CH-CH_2-R_6$$

in which $Z_1$ represents a member selected from the group consisting of

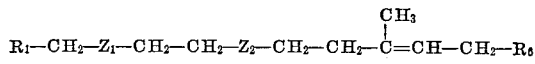

and

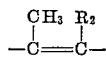

$Z_2$ represents a member selected from the group consisting of

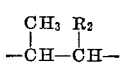

and

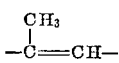

$R_1$ represents a member selected from the group consisting of hydrogen and lower alkyl; $R_2$ represents a member selected from the group consisting of hydrogen and lower alkyl; and $R_6$ represents a member selected from the group consisting of —$NH_2$, NH—Y

O—Y and S—Y wherein the symbol Y represents a member selected from the group consisting of lower alkyl and lower alkenyl radicals and (b) a pesticidal adjuvant therefore, there being present in said composition up to about 10% by weight of said component (a).

2. A process for hindering the reproduction of arthropodes which comprises treating said arthropodes at any stage of their development with an effective pesticidal amount of a composition comprising (a) a compound having the formula

in which $Z_1$ represents a member selected from the group consisting of

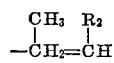

and

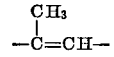

$Z_2$ represents a member selected from the group consisting of

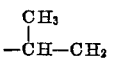

and $$\overset{\overset{\displaystyle CH_3}{|}}{-CH-CH_2}$$

$R_1$ represents a member selected from the group consisting of hydrogen and lower alkyl; $R_2$ represents a member selected from the group consisting of hydrogen and lower alkyl; and $R_6$ represents a member selected from the group consisting of —$NH_2$, NH—Y,

O—Y and S—Y wherein the symbol Y represents a member selected from the group consisting of lower alkyl and lower alkenyl radicals and (b) a pesticidal adjuvant therefor, there being present in said composition up to about 10% by weight of said component (a).

3. A process for hindering the metamorphosis of arthropodes which comprises treating said arthropodes at any stage of their development with an effective pesticidal amount of a composition comprising (a) farnesol and (b) a pesticidal adjuvant therefor, there being present in said composition up to about 10% by weight of said farnesol.

4. A process for hindering the reproduction of arthropodes which comprises treating said arthropodes at any stage of their development with an effective pesticidal amount of a composition comprising (a) farnesol and (b) a pesticidal adjuvant therefor, there being present in said composition up to about 10% by weight of said farnesol.

5. A process for hindering the metamorphosis of arthropodes which comprises treating said arthropodes at any stage of their development with an effective pesticidal amount of a composition comprising (a) farnesal and (b) a pesticidal adjuvant therefor, there being present in said composition up to about 10% by weight of said farnesal.

6. A process for hindering the reproduction of arthropodes which comprises treating said arthropodes at any stage of their development with an effective pesticidal amount of a composition comprising (a) farnesal and (b) a pesticidal adjuvant therefor, there being present in said composition up to about 10% by weight of said farnesal.

References Cited

UNITED STATES PATENTS

| | | | |
|---|---|---|---|
| 2,421,090 | 5/1947 | Smith et al. | 260—614 |
| 2,429,411 | 10/1947 | Jones et al. | 260—614 |
| 2,902,515 | 9/1959 | Montavon et al. | 260—598 |
| 2,768,212 | 10/1956 | Copenhaver | 260—611 |
| 2,812,550 | 11/1957 | Niederhauser | 260—567.6 |
| 2,841,620 | 7/1958 | Colaianni et al. | 260—611 |
| 2,995,600 | 8/1961 | Webb | 260—614 |
| 2,933,530 | 4/1960 | Kralt et al. | 260—567.6 |
| 2,548,679 | 4/1951 | Olin | 260—567.6 |
| 3,123,640 | 3/1964 | Longley | 260—567.6 |
| 2,889,243 | 6/1959 | Underwood et al. | 167—22 |
| 2,564,664 | 8/1951 | Bartlett et al. | 167—22 |
| 2,905,722 | 9/1959 | Montagna | 260—614 |
| 3,061,649 | 10/1962 | Erickson et al. | 260—611 |
| 2,994,699 | 8/1961 | DeBenneville | 260—567 |

FOREIGN PATENTS 839,865  7/1960  Great Britain.

OTHER REFERENCES

Chemical Abst., vol. 44, p. 3080(b) (1950).
Chemical Abst., vol. 53, p. 12467(f) (1959).
Chemical Abst., vol. 54, p. 15272(c) (1960).
Chemical Abst., vol. 52, p. 11737(g( (1958).
Chemical Abst., vol. 55, p. 26054(d) (1961).
Chemical Abst., vol. 50, pp. 8444–8445 (1956).
Chemical Abst., vol. 23, p. 4826 (1929).
Chemical Abst., vol. 44, pp. 1896–1897 (1950).
Baudert (I), Compt. Rend., vol. 217, pp. 399–400 (1943).
Shelton et al., J.A.C.S., vol. 68, pp. 753–755 (1946).
Baudert (II), Chem. Abst., vol. 41, p. 2694 (1947).

ALBERT T. MEYERS, *Primary Examiner.*

R. S. DORCAS, *Assistant Examiner.*

U.S. Cl. X.R.

260—567.6, 583, 614, 609; 424—335, 331, 325, 342, 337, 318, 343

UNITED STATES PATENT OFFICE

CERTIFICATE OF CORRECTION

Patent No. 3,429,970 February 25, 1969

Rudolf Rüegg et al.

It is certified that error appears in the above identified patent and that said Letters Patent are hereby corrected as shown below:

Column 2, line 67, "Furthremore," should read -- Furthermore, --. Column 8, lines 32 to 34, the formula reading:

Column 9, line 19, "2,812,550" should read -- 2,812,350 --. Column 10, line 13 "4826" should read -- 4926 --.

Signed and sealed this 14th day of April 1970.

(SEAL)
Attest:

Edward M. Fletcher, Jr.
Attesting Officer

WILLIAM E. SCHUYLER, JR.
Commissioner of Patents